US010684969B2

(12) United States Patent
Magro et al.

(10) Patent No.: US 10,684,969 B2
(45) Date of Patent: Jun. 16, 2020

(54) COMMAND ARBITRATION FOR HIGH SPEED MEMORY INTERFACES

(71) Applicant: Advanced Micro Devices, Inc., Sunnyvale, CA (US)

(72) Inventors: James R. Magro, Austin, TX (US); Kedarnath Balakrishnan, Austin, TX (US); Jackson Peng, San Jose, CA (US); Hideki Kanayama, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 474 days.

(21) Appl. No.: 15/211,815

(22) Filed: Jul. 15, 2016

(65) Prior Publication Data
US 2018/0018291 A1 Jan. 18, 2018

(51) Int. Cl.
*G06F 13/16* (2006.01)
*G06F 13/40* (2006.01)

(52) U.S. Cl.
CPC ...... *G06F 13/1689* (2013.01); *G06F 13/4068* (2013.01)

(58) Field of Classification Search
CPC .......................... G06F 13/1689; G06F 13/4068
See application file for complete search history.

(56) References Cited

U.S. PATENT DOCUMENTS

| 6,496,906 B1 | 12/2002 | Novak et al. |
| 8,271,746 B1 * | 9/2012 | Hutsell ............... G06F 13/1642 711/156 |
| 9,911,477 B1 * | 3/2018 | Teh .................. H03K 19/17744 |
| 2003/0005253 A1 | 1/2003 | Liao et al. |
| 2007/0294470 A1 | 12/2007 | Van Dyke et al. |
| 2009/0055566 A1 | 2/2009 | Reinig et al. |
| 2010/0318750 A1 | 12/2010 | Eckert |
| 2011/0179200 A1 * | 7/2011 | Sukonik ............. G06F 13/1626 710/53 |
| 2011/0276727 A1 | 11/2011 | Arntzen et al. |

(Continued)

FOREIGN PATENT DOCUMENTS

WO     2007067739 A1     6/2007

OTHER PUBLICATIONS

International Search Report and Written Opinion for International Application No. PCT/US2016/053131, dated Apr. 14, 2017, 13 pages.

(Continued)

*Primary Examiner* — Zachary K Huson
(74) *Attorney, Agent, or Firm* — Polansky & Associates, P.L.L.C.; Paul J. Polansky

(57) ABSTRACT

In one form, a memory controller includes a command queue and an arbiter. The command queue receives and stores memory access requests. The arbiter includes a plurality of sub-arbiters for providing a corresponding plurality of sub-arbitration winners from among the memory access requests during a controller cycle, and for selecting among the plurality of sub-arbitration winners to provide a plurality of memory commands in a corresponding controller cycle. In another form, a data processing system includes a memory accessing agent for providing memory accesses requests, a memory system, and the memory controller coupled to the memory accessing agent and the memory system.

27 Claims, 5 Drawing Sheets

(56) References Cited

U.S. PATENT DOCUMENTS

2012/0072702 A1    3/2012  Pierson et al.
2014/0115254 A1    4/2014  Sukonik et al.
2017/0168934 A1*  6/2017  Singh .................. G06F 12/0646

OTHER PUBLICATIONS

Search Report in European Patent Application No. EP16200971.6, dated Jun. 12, 2017, 6 pages.

* cited by examiner

COMMAND ARBITRATION FOR HIGH SPEED MEMORY INTERFACES

FIELD

This disclosure relates generally to data processing systems, and more specifically to memory controllers for use in data processing systems with high speed memory interfaces.

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus. For example, DDR4 DRAMs use memory cell arrays that require 12-15 nanosecond (ns) access times, but access large amounts of data and serialize the data at speeds up to 3.2 giga transfers per second (GT/sec) corresponding to a memory clock frequency of 1.6 gigahertz (GHz). The transfers use pseudo-open-drain techniques with on-die termination for good transmission line performance. While it is possible to operate a point-to-point interface at that rate to achieve fast transfers, it has become increasingly difficult for memory controllers to operate at fast enough speeds to schedule memory accesses.

A typical DDR memory controller maintains a queue to store pending read and write requests to allow the memory controller to pick the pending requests out of order and thereby to increase efficiency. For example, the memory controller can retrieve multiple memory access requests to the same row in a given rank of memory (referred to as "page hits") from the queue out of order and issue them consecutively to the memory system to avoid the overhead of precharging the current row and activating another row repeatedly. However scanning and picking accesses from a deep queue while taking advantage of the bus bandwidth available with modern memory technologies such as DDR4 has become difficult to achieve with known memory controllers.

Figure 1:
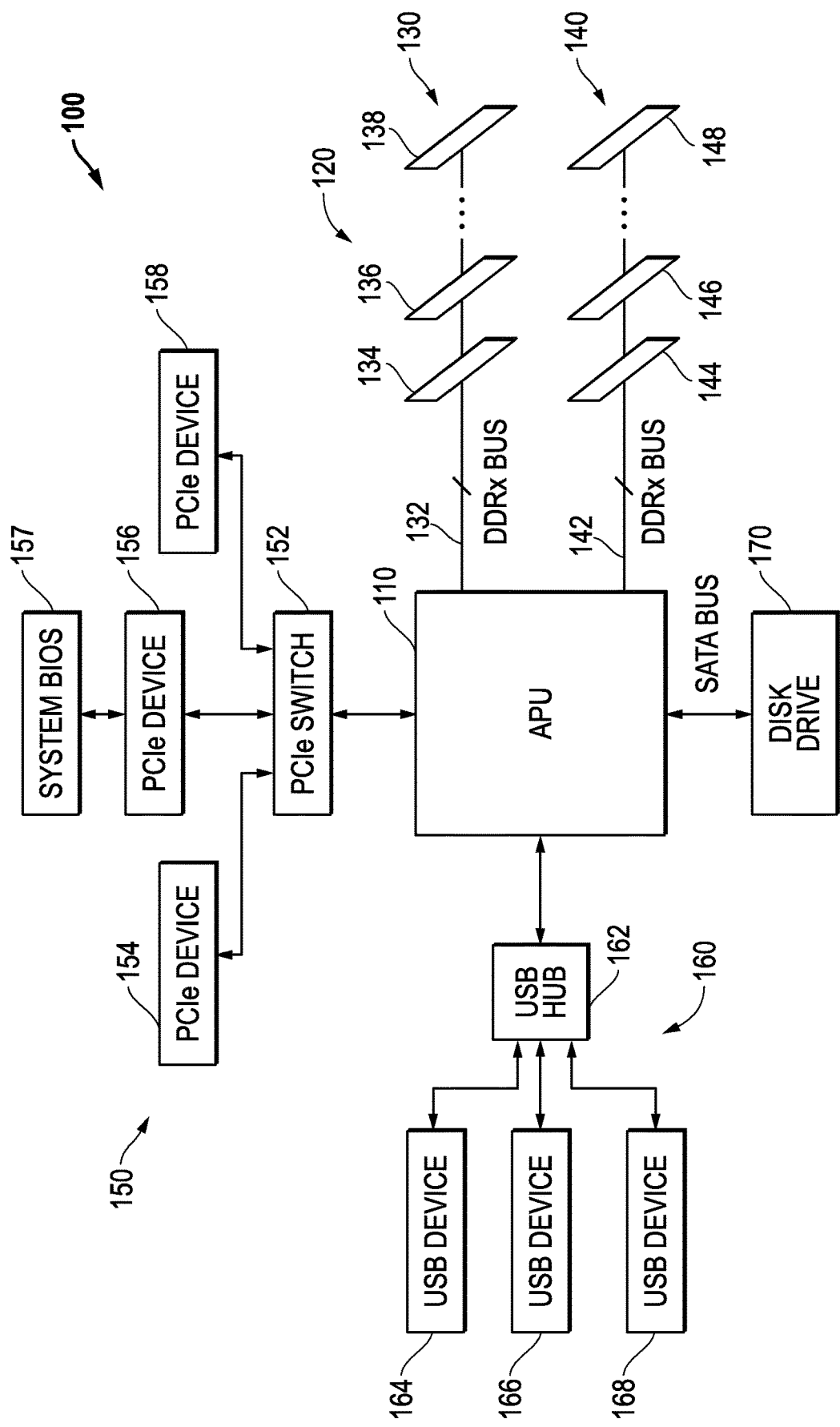
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a memory controller includes a command queue and an arbiter. The command queue is for receiving and storing memory access requests. The arbiter includes a plurality of sub-arbiters providing a corresponding plurality of sub-arbitration winners from among the memory access requests during a controller cycle, and selects among the plurality of sub-arbitration winners to provide a plurality of memory commands in a corresponding controller cycle. In some embodiments, a memory command cycle may be shorter in time than the controller cycle. For example, the controller can operate according to a controller clock signal while the memory cycles are defined by a memory clock signal, the memory clock signal having a higher frequency than the controller clock signal. The plurality of sub-arbiters can include a first sub-arbiter that selects a first sub-arbitration winner among page hit commands in the command queue, a second sub-arbiter that selects a second sub-arbitration winner among page conflict commands in the command queue, and a third sub-arbiter that selects a third sub-arbitration winner among page miss commands in the command queue. The arbiter can further include a final arbiter for selecting among the first, second, and third sub-arbitration winner.

In another form, a data processing system includes a memory accessing agent for providing a plurality of memory access requests, a memory system, and a memory controller coupled to the memory accessing agent and the memory system. The memory controller includes a command queue and an arbiter. The command queue stores memory access commands received from the memory accessing agent. The arbiter includes a plurality of sub-arbiters for providing a corresponding plurality of sub-arbitration winners from among the memory access requests during a controller cycle and for selecting among the plurality of sub-arbitration winners to provide a plurality of memory commands in a corresponding controller cycle.

In yet another form, a method for arbitrating among memory access requests may be used to improve performance and efficiency. A plurality of memory access requests are received and stored in a command queue. A plurality of sub-arbitration winners are selected from among the memory access requests during a first controller cycle. A plurality of memory commands are selected among the plurality of sub-arbitration winners and provided in a corresponding plurality of memory command cycles.

FIG. 1 illustrates in block diagram form a data processing system 100 according to some embodiments. Data processing system 100 includes generally a data processor 110 in the form of an accelerated processing unit (APU), a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a DDRx bus 132, including representative DIMMs 134, 136, and 138 that in this example correspond to separate ranks. Likewise memory channel 140 includes a set of DIMMs connected to a DDRx bus 142, including representative DIMMs 144, 146, and 148.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing a memory channel 130 and a memory channel 140. Each of memory channels 130 and 140 can connect to state-of-the-art DDR memories such as DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Figure 2:
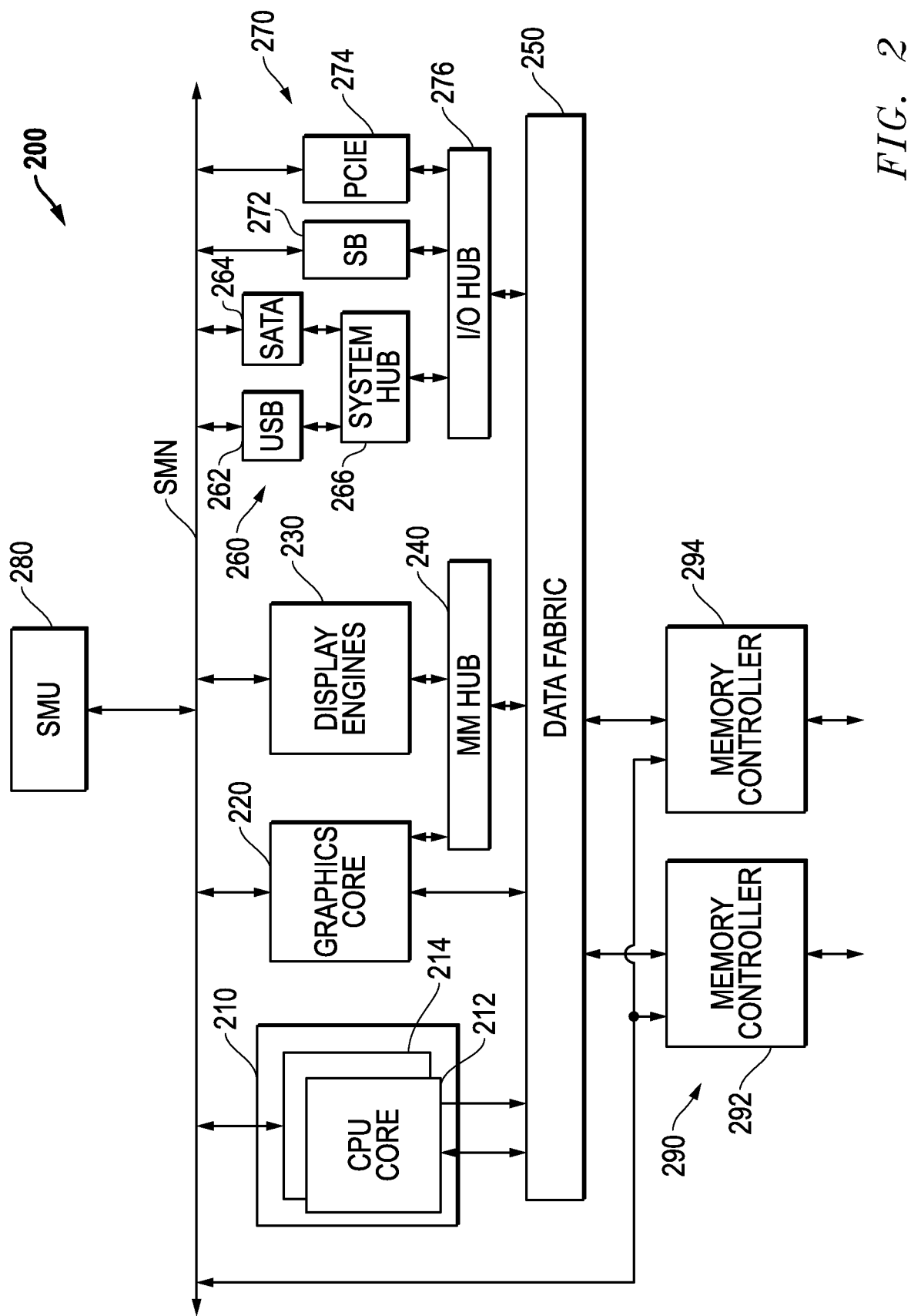
FIG. 2 illustrates in block diagram form an accelerated processing unit (APU) suitable for use in the data processing system of FIG. 1.

FIG. 2 illustrates in block diagram form an APU 200 suitable for use in data processing system 100 of FIG. 1. APU 200 includes generally a central processing unit (CPU) core complex 210, a graphics core 220, a set of display engines 230, a memory management hub 240, a data fabric 250, a set of peripheral controllers 260, a set of peripheral bus controllers 270, a system management unit (SMU) 280, and a set of memory controllers 290.

CPU core complex 210 includes a CPU core 212 and a CPU core 214. In this example, CPU core complex 210 includes two CPU cores, but in other embodiments CPU core complex 210 can include an arbitrary number of CPU cores. Each of CPU cores 212 and 214 is bidirectionally connected to a system management network (SMN), which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 250, and is capable of providing memory access requests to data fabric 250. In this regard, APU 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210.

Display engines 230 render and rasterize objects generated by graphics core 220 for display on a monitor. Graphics core 220 and display engines 230 are bidirectionally connected to a common memory management hub 240 for uniform translation into appropriate addresses in memory system 120, and memory management hub 240 is bidirectionally connected to data fabric 250 for generating such memory accesses and receiving read data returned from the memory system.

Data fabric 250 includes a crossbar switch for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 260 include a USB controller 262 and a SATA interface controller 264, each of which is bidirectionally connected to a system hub 266 and to the SMN bus. These two controllers are merely exemplary of peripheral controllers that may be used in APU 200.

Peripheral bus controllers 270 include a system controller or "Southbridge" (SB) 272 and a PCIe controller 274, each of which is bidirectionally connected to an input/output (I/O) hub 276 and to the SMN bus. I/O hub 276 is also bidirectionally connected to system hub 266 and to data fabric 250. Thus for example a CPU core can program registers in USB controller 262, SATA interface controller 264, SB 272, or PCIe controller 274 through accesses that data fabric 250 routes through I/O hub 276.

SMU 280 is a local controller that controls the operation of the resources on APU 200 and synchronizes communication among them. SMU 280 manages power-up sequencing of the various processors on APU 200 and controls multiple off-chip devices via reset, enable and other signals. SMU 280 includes one or more clock sources not shown in FIG. 2, such as a phase locked loop (PLL), to provide clock signals for each of the components of APU 200. SMU 280 also manages power for the various processors and other functional blocks, and may receive measured power consumption values from CPU cores 212 and 214 and graphics core 220 to determine appropriate power states.

APU 200 also implements various system monitoring and power saving functions. In particular one system monitoring function is thermal monitoring. For example, if APU 200 becomes hot, then SMU 280 can reduce the frequency and voltage of CPU cores 212 and 214 and/or graphics core 220. If APU 200 becomes too hot, then it can be shut down entirely. Thermal events can also be received from external sensors by SMU 280 via the SMN bus, and SMU 280 can reduce the clock frequency and/or power supply voltage in response.

Figure 3:
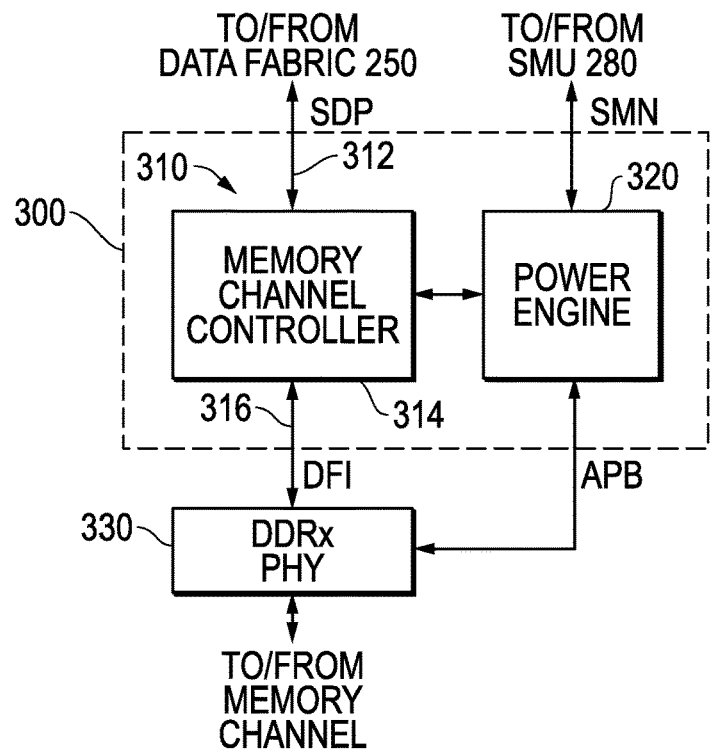
FIG. 3 illustrates in block diagram form a memory controller and associated physical interface (PHY) suitable for use in the APU of FIG. 2 according to some embodiments.

FIG. 3 illustrates in block diagram form a memory controller 300 and an associated physical interface (PHY) 330 suitable for use in APU 200 of FIG. 2 according to some embodiments. Memory controller 300 includes a memory channel 310 and a power engine 320. Memory channel 310 includes a host interface 312, a memory channel controller 314, and a physical interface 316. Host interface 312 bidirectionally connects memory channel controller 314 to data fabric 250 over a scalable data port (SDP). Physical interface 316 bidirectionally connects memory channel controller 314 to PHY 330 over a bus that conforms to the DDR-PHY Interface Specification (DFI). Power engine 320 is bidirectionally connected to SMU 280 over the SMN bus, to PHY 330 over the Advanced Peripheral Bus (APB), and is also bidirectionally connected to memory channel controller 314. PHY 330 has a bidirectional connection to a memory channel such as memory channel 130 or memory channel 140 of FIG. 1. Memory controller 300 is an instantiation of a memory controller for a single memory channel using a single memory channel controller 314, and has a power engine 320 to control operation of memory channel controller 314 in a manner that will be described further below.

Figure 4:
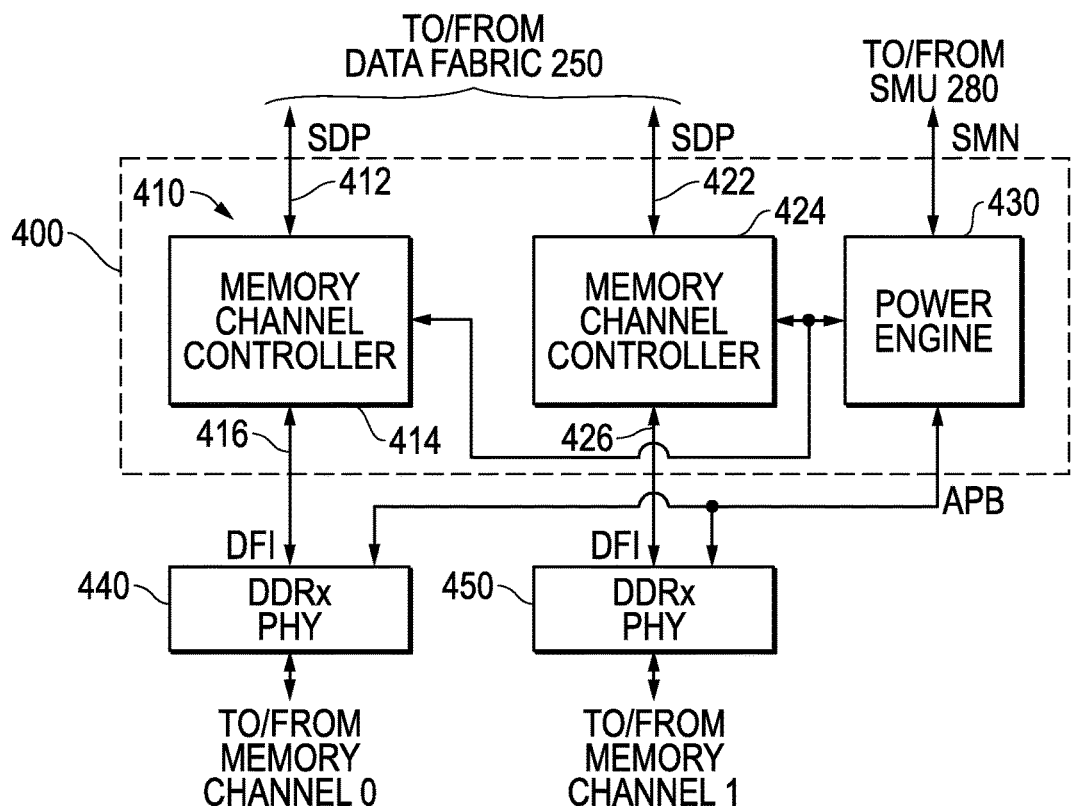
FIG. 4 illustrates in block diagram form another memory controller and associated PHY suitable for use in the APU of FIG. 2 according to some embodiments.

FIG. 4 illustrates in block diagram form another memory controller 400 and associated PHYs 440 and 450 suitable for use in APU 200 of FIG. 2 according to some embodiments. Memory controller 400 includes a memory channels 410 and 420 and a power engine 430. Memory channel 410 includes a host interface 412, a memory channel controller 414, and a physical interface 416. Host interface 412 bidirectionally connects memory channel controller 414 to data fabric 250 over an SDP. Physical interface 416 bidirectionally connects memory channel controller 414 to PHY 440, and conforms to the DFI Specification. Memory channel 420 includes a host interface 422, a memory channel controller 424, and a physical interface 426. Host interface 422 bidirectionally connects memory channel controller 424 to data fabric 250 over another SDP. Physical interface 426 bidirectionally connects memory channel controller 424 to PHY 450, and conforms to the DFI Specification. Power engine 430 is bidirectionally connected to SMU 280 over the SMN bus, to PHYs 440 and 450 over the APB, and is also bidirectionally connected to memory channel controllers 414 and 424. PHY 440 has a bidirectional connection to a memory channel such as memory channel 130 of FIG. 1. PHY 450 has a bidirectional connection to a memory channel such as memory channel 140 of FIG. 1. Memory controller 400 is an instantiation of a memory controller having two memory channel controllers and uses a shared power engine 430 to control operation of both memory channel controller 414 and memory channel controller 424 in a manner that will be described further below.

Figure 5:
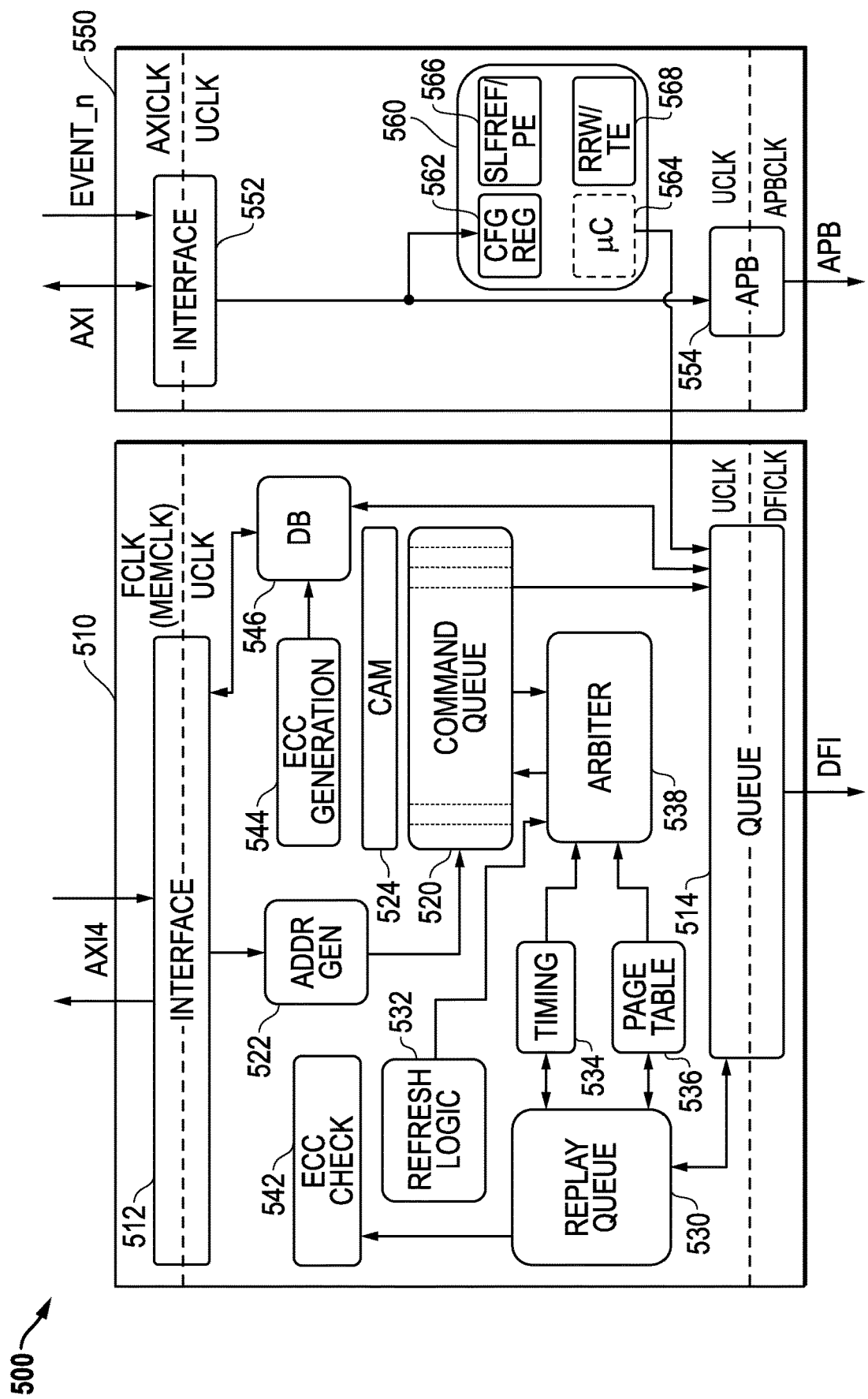
FIG. 5 illustrates in block diagram form a memory controller according to some embodiments.

FIG. 5 illustrates in block diagram form a memory controller 500 according to some embodiments. Memory controller 500 includes a memory channel controller 510 and a power controller 550. Memory channel controller 510 includes an interface 512, a queue 514, a command queue 520, an address generator 522, a content addressable memory (CAM) 524, a replay queue 530, a refresh logic block 532, a timing block 534, a page table 536, an arbiter 538, an error correction code (ECC) check block 542, an ECC generation block 544, and a data buffer (DB) 546.

Interface 512 has a first bidirectional connection to data fabric 250 over an external bus, and has an output. In memory controller 500, this external bus is compatible with the advanced extensible interface version four specified by ARM Holdings, PLC of Cambridge, England, known as "AXI4", but can be other types of interfaces in other embodiments. Interface 512 translates memory access requests from a first clock domain known as the FCLK (or MEMCLK) domain to a second clock domain internal to memory controller 500 known as the UCLK domain. Similarly, queue 514 provides memory accesses from the UCLK domain to the DFICLK domain associated with the DFI interface.

Address generator 522 decodes addresses of memory access requests received from data fabric 250 over the AXI4 bus. The memory access requests include access addresses in the physical address space represented in as a normalized address. Address generator 522 converts the normalized addresses into a format that can be used to address the actual memory devices in memory system 120, as well as to efficiently schedule related accesses. This format includes a region identifier that associates the memory access request with a particular rank, a row address, a column address, a bank address, and a bank group. On startup, the system BIOS queries the memory devices in memory system 120 to determine their size and configuration, and programs a set of configuration registers associated with address generator 522. Address generator 522 uses the configuration stored in the configuration registers to translate the normalized addresses into the appropriate format. Command queue 520 is a queue of memory access requests received from the memory accessing agents in data processing system 100, such as CPU cores 212 and 214 and graphics core 220. Command queue 520 stores the address fields decoded by address generator 522 as well other address information that allows arbiter 538 to select memory accesses efficiently, including access type and quality of service (QoS) identifiers. CAM 524 includes information to enforce ordering rules, such as write after write (WAW) and read after write (RAW) ordering rules.

Replay queue 530 is a temporary queue for storing memory accesses picked by arbiter 538 that are awaiting responses, such as address and command parity responses, write cyclic redundancy check (CRC) responses for DDR4 DRAM or write and read CRC responses for GDDR5 DRAM. Replay queue 530 accesses ECC check block 542 to determine whether the returned ECC is correct or indicates an error. Replay queue 530 allows the accesses to be replayed in the case of a parity or CRC error of one of these cycles.

Refresh logic 532 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic 532 generates auto-refresh commands periodically to prevent data errors caused by leaking of charge off storage capacitors of memory cells in DRAM chips. In addition, refresh logic 532 periodically calibrates ZQ to prevent mismatch in on-die termination resistance due to thermal changes in the system. Refresh logic 532 also decides when to put DRAM devices in different power down modes.

Arbiter 538 is bidirectionally connected to command queue 520 and is the heart of memory channel controller 510. It improves efficiency by intelligent scheduling of accesses to improve the usage of the memory bus. Arbiter 538 uses timing block 534 to enforce proper timing relationships by determining whether certain accesses in command queue 520 are eligible for issuance based on DRAM timing parameters. For example, each DRAM has a minimum specified time between activate commands to the same bank, known as "$t_{RC}$". Timing block 534 maintains a set of counters that determine eligibility based on this and other timing parameters specified in the JEDEC specification, and is bidirectionally connected to replay queue 530. Page table 536 maintains state information about active pages in each bank and rank of the memory channel for arbiter 538, and is bidirectionally connected to replay queue 530.

In response to write memory access requests received from interface 512, ECC generation block 544 computes an ECC according to the write data. DB 546 stores the write data and ECC for received memory access requests. It outputs the combined write data/ECC to queue 514 when arbiter 538 picks the corresponding write access for dispatch to the memory channel.

Power controller 550 includes an interface 552 to an advanced extensible interface, version one (AXI), an APB interface 554, and a power engine 560. Interface 552 has a first bidirectional connection to the SMN, which includes an input for receiving an event signal labeled "EVENT_n" shown separately in FIG. 5, and an output. APB interface 554 has an input connected to the output of interface 552, and an output for connection to a PHY over an APB. Power engine 560 has an input connected to the output of interface 552, and an output connected to an input of queue 514. Power engine 560 includes a set of configuration registers 562, a microcontroller (μC) 564, a self refresh controller (SLFREF/PE) 566, and a reliable read/write training engine (RRW/TE) 568. Configuration registers 562 are programmed over the AXI bus, and store configuration information to control the operation of various blocks in memory controller 500. Accordingly, configuration registers 562 have outputs connected to these blocks that are not shown in detail in FIG. 5. Self refresh controller 566 is an engine that allows the manual generation of refreshes in addition to the automatic generation of refreshes by refresh logic 532. Reliable read/write training engine 568 provides a continuous memory access stream to memory or I/O devices for such purposes as DDR interface read latency training and loopback testing.

Memory channel controller 510 includes circuitry that allows it to pick memory accesses for dispatch to the associated memory channel. In order to make the desired arbitration decisions, address generator 522 decodes the address information into predecoded information including rank, row address, column address, bank address, and bank group in the memory system, and command queue 520 stores the predecoded information. Configuration registers 562 store configuration information to determine how address generator 522 decodes the received address information. Arbiter 538 uses the decoded address information, timing eligibility information indicated by timing block 534, and active page information indicated by page table 536 to efficiently schedule memory accesses while observing other criteria such as QoS requirements. For example, arbiter 538 implements a preference for accesses to open pages to avoid the overhead of precharge and activation commands required to change memory pages, and hides overhead accesses to one bank by interleaving them with read and write accesses to another bank. In particular during normal operation, arbiter 538 may decide to keeps pages open in different banks until they are required to be precharged prior to selecting a different page.

Figure 6:
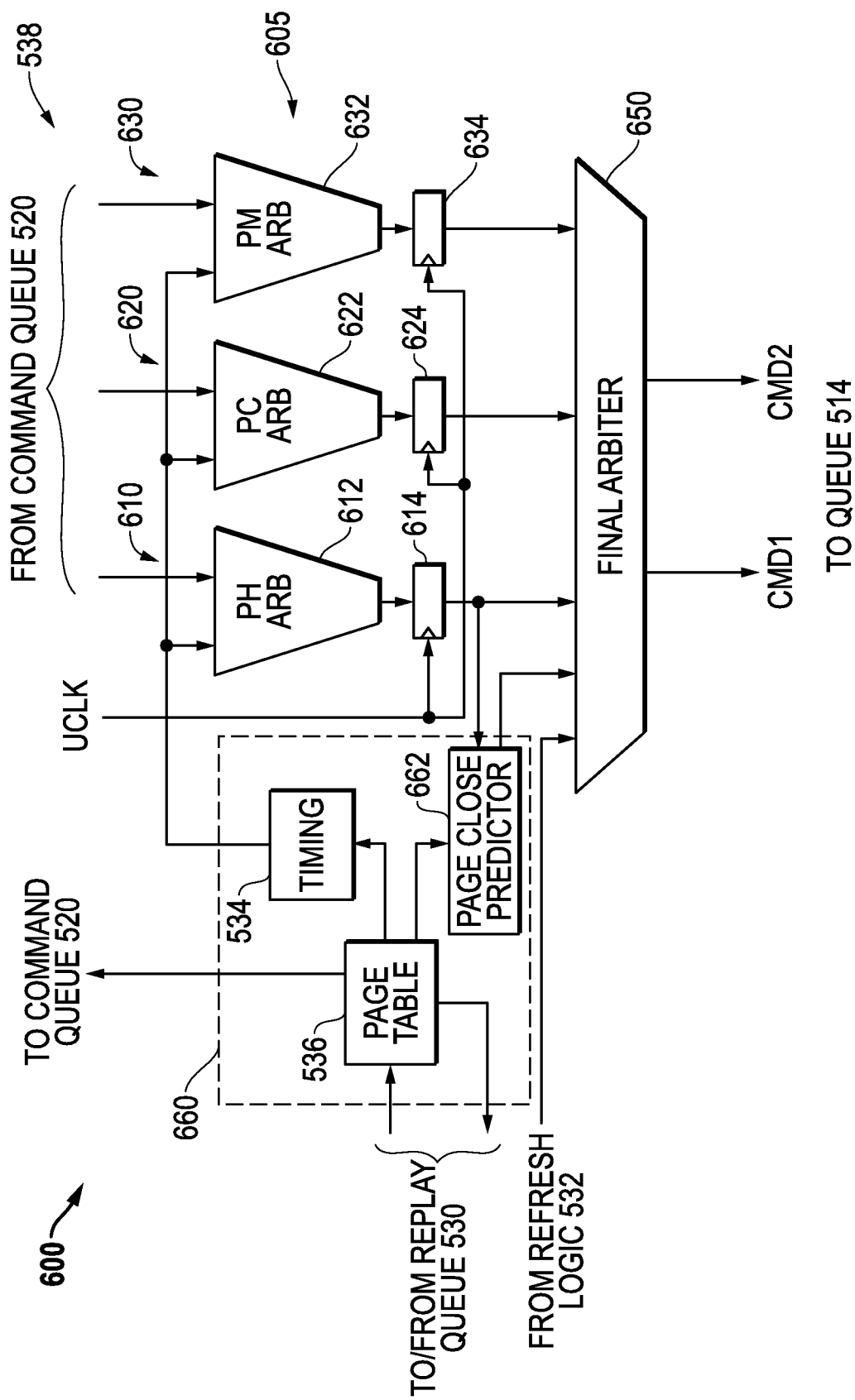
FIG. 6 illustrates a block diagram an arbiter that may be used as the arbiter of FIG. 5 according to some embodiments.

FIG. 6 illustrates a block diagram of a portion 600 of memory controller 500 of FIG. 5 according to some embodiments. Portion 600 includes arbiter 538 and a set of control circuits 660 associated with the operation of arbiter 538. Arbiter 538 includes a set of sub-arbiters 605 and a final arbiter 650. Sub-arbiters 605 include a sub-arbiter 610, a sub-arbiter 620, and a sub-arbiter 630. Sub-arbiter 610 includes a page hit arbiter 612 labeled "PH ARB", and an output register 614. Page hit arbiter 612 has a first input connected to command queue 520, a second input, and an output. Register 614 has a data input connected to the output of page hit arbiter 612, a clock input for receiving the UCLK signal, and an output. Sub-arbiter 620 includes a page conflict arbiter 622 labeled "PC ARB", and an output register 624. Page conflict arbiter 622 has a first input connected to command queue 520, a second input, and an output. Register 624 has a data input connected to the output of page conflict arbiter 622, a clock input for receiving the UCLK signal, and an output. Sub-arbiter 630 includes a page miss arbiter 632 labeled "PM ARB", and an output register 634. Page miss arbiter 632 has a first input connected to command queue 520, a second input, and an output. Register 634 has a data input connected to the output of page miss arbiter 632, a clock input for receiving the UCLK signal, and an output. Final arbiter 650 has a first input connected to the output of refresh logic 532, a second input from a page close predictor 662, a third input connected to the output of output register 614, a fourth input connected to the output of output register 624, a fifth input connected to the output of output register 634, a first output for providing a first arbitration winner to queue 514 labeled "CMD1", and a second output for providing a second arbitration winner to queue 514 labeled "CMD2".

Control circuits 660 include timing block 534 and page table 536 as previously described with respect to FIG. 5, and a page close predictor 662. Timing block 534 has an input and an output connected to the first inputs of page hit arbiter 612, page conflict arbiter 622, and page miss arbiter 632. Page table 534 has an input connected to an output of replay queue 530, an output connected to an input of replay queue 530, an output connected to the input of command queue 520, an output connected to the input of timing block 534, and an output connected to the input of page close predictor 662. Page close predictor 662 has an input connected to one output of page table 536, an input connected to the output of output register 614, and an output connected to the second input of final arbiter 650.

In operation, arbiter 538 selects memory access requests (commands) from command queue 520 and refresh logic 532 by taking into account the page status of each entry, the priority of each memory access request, and the dependencies between requests. The priority is related to the quality of service or QoS of requests received from the AXI4 bus and stored in command queue 520, but can be altered based on the type of memory access and the dynamic operation of arbiter 538. Arbiter 538 includes three sub-arbiters that operate in parallel to address the mismatch between the processing and transmission limits of existing integrated circuit technology. The winners of the respective sub-arbitrations are presented to final arbiter 650. Final arbiter 650 selects between these three sub-arbitration winners as well as a refresh operation from refresh logic 532, and may further modify a read or write command into a read or write with auto-precharge command as determined by page close predictor 662.

Each of page hit arbiter 612, page conflict arbiter 622, and page miss arbiter 632 has an input connected to the output of timing block 534 to determine timing eligibility of commands in command queue 520 that fall into these respective categories. Timing block 534 includes an array of binary counters that count durations related to the particular operations for each bank in each rank. The number of timers needed to determine the status depends on the timing parameter, the number of banks for the given memory type, and the number of ranks supported by the system on a given memory channel. The number of timing parameters that are implemented in turn depends on the type of memory implemented in the system. For example, GDDR5 memories require more timers to comply with more timing parameters than other DDRx memory types. By including an array of generic timers implemented as binary counters, timing block 534 can be scaled and reused for different memory types.

A page hit is a read or write cycle to an open page. Page hit arbiter 612 arbitrates between accesses in command queue 520 to open pages. The timing eligibility parameters tracked by timers in timing block 534 and checked by page hit arbiter 612 include, for example, row address strobe (RAS) to column address strobe (CAS) delay time ($t_{RCD}$) and CAS latency ($t_{CL}$). For example, $t_{RCD}$ specifies the minimum amount of time that must elapse before a read or write access to a page after it has been opened in a RAS cycle. Page hit arbiter 612 selects a sub-arbitration winner based on the assigned priority of the accesses. In one embodiment, the priority is a 4-bit, one-hot value that therefore indicates a priority among four values, however it should be apparent that this four-level priority scheme is just one example. If page hit arbiter 612 detects two or more requests at the same priority level, then the oldest entry wins.

A page conflict is an access to one row in a bank when another row in the bank is currently activated. Page conflict arbiter 622 arbitrates between accesses in command queue 520 to pages that conflict with the page that is currently open in the corresponding bank and rank. Page conflict arbiter 622 selects a sub-arbitration winner that causes the issuance of a precharge command. The timing eligibility parameters tracked by timers in timing block 534 and checked by page conflict arbiter 622 include, for example, active to precharge command period ($t_{RAS}$). Page conflict arbiter 622 selects a sub-arbitration winner based on the assigned priority of the access. If page conflict arbiter 622 detects two or more requests at the same priority level, then the oldest entry wins.

A page miss is an access to a bank that is in the precharged state. Page miss arbiter 632 arbitrates between accesses in command queue 520 to precharged memory banks. The timing eligibility parameters tracked by timers in timing block 534 and checked by page miss arbiter 632 include, for example, precharge command period ($t_{RP}$). If there are two or more requests that are page misses at the same priority level, then the oldest entry wins.

Each sub-arbiter outputs a priority value for their respective sub-arbitration winner. Final arbiter 650 compares the priority values of the sub-arbitration winners from each of page hit arbiter 612, page conflict arbiter 622, and page miss arbiter 632. Final arbiter 650 determines the relative priority among the sub-arbitration winners by performing a set of relative priority comparisons taking into account two sub-arbitration winners at a time.

After determining the relative priority among the three sub-arbitration winners, final arbiter 650 then determines whether the sub-arbitration winners conflict (i.e. whether they are directed to the same bank and rank). When there are no such conflicts, then final arbiter 650 selects up to two sub-arbitration winners with the highest priorities. When there are conflicts, then final arbiter 650 complies with the following rules. When the priority value of the sub-arbitration winner of page hit arbiter 612 is higher than that of page conflict arbiter 622, and they are both to the same bank and rank, then final arbiter 650 selects the access indicated by page hit arbiter 612. When the priority value of the sub-arbitration winner of page conflict arbiter 622 is higher than that of page hit arbiter 612, and they are both to the same bank and rank, final arbiter 650 selects the winner based on several additional factors. In some cases, page close predictor 662 causes the page to close at the end of the access indicated by page hit arbiter 612 by setting the auto precharge attribute.

Within page hit arbiter 612, priority is initially set by the request priority from the memory accessing agent but is adjusted dynamically based on the type of accesses (read or write) and the sequence of accesses. In general, page hit arbiter 612 assigns a higher implicit priority to reads, but implements a priority elevation mechanism to ensure that writes make progress toward completion.

Whenever page hit arbiter 612 selects a read or write command, page close predictor 662 determines whether to send the command with the auto-precharge (AP) attribute or not. During a read or write cycle, the auto-precharge attribute is set with a predefined address bit and the auto-precharge attribute causes the DDR device to close the page after the read or write cycle is complete, which avoids the need for the memory controller to later send a separate precharge command for that bank. Page close predictor 662 takes into account other requests already present in command queue 520 that access the same bank as the selected command. If page close predictor 662 converts a memory access into an AP command, the next access to that page will be a page miss.

Arbiter 538 supports issuing of either one command or two commands per memory controller clock cycle. For example, DDR4 3200 is a speed bin of DDR4 DRAM that operates with a memory clock frequency of 1600 MHz. If the integrated circuit process technology allows memory controller 500 to operate at 1600 MHz, then memory controller 500 can issue one memory access every memory controller clock cycle. In this case final arbiter 650 is enabled to operate in a 1× mode to select only a single arbitration winner every memory controller clock cycle.

However for higher speed memory, such as DDR4 3600 or LPDDR4 4667, the 1600 MHz memory controller clock speed may be too slow to use the full bandwidth of the memory bus. To accommodate these higher performance DRAMs, arbiter 538 also supports a 2× mode in which final arbiter 650 selects two commands (CMD1 and CMD2) every memory controller clock cycle. Arbiter 538 provides this mode to allow each sub-arbiter to work in parallel using the slower memory controller clock. As shown in FIG. 6, arbiter 538 includes three sub-arbiters, and in 2× mode, final arbiter 650 selects two arbitration winners as the best two of three.

Note that the 2× mode also allows memory controller 500 to operate at a slower memory controller clock speed than its highest speed to align the memory controller command generation to the memory clock cycle. For the example of DDR4 3600 when the memory controller can operate up to a clock speed of 1600 MHz, the clock speed can be reduced to 900 MHz in 2× mode.

By using different sub-arbiters for different memory access types, each arbiter can be implemented with simpler logic than if it were required to arbitrate between all access types (page hits, page misses, and page conflicts). Thus the arbitration logic can be simplified and the size of arbiter 538 can be kept relatively small. By using sub-arbiters for page hits, page conflicts, and page misses, arbiter 538 allows the picking of two commands which pair well with each other to hide latency accesses with data transfers.

In other embodiments, arbiter 538 could include a different number of sub-arbiters as long as it has at least two to support 2X mode. For example, arbiter 538 could include four sub-arbiters and would allow up to four accesses to be picked per memory controller clock cycle. In yet other embodiments, arbiter 538 could include two or more sub-arbiters of any single type. For example arbiter 538 could include two or more page hit arbiters, two or more page conflict arbiters, and/or two or more page miss arbiters. In this case, arbiter 538 is able to select two or more accesses of the same type each controller cycle.

The circuits of FIGS. 5 and 6 may be implemented with various combinations of hardware and software. For example the hardware circuitry may include priority encoders, finite state machines, programmable logic arrays (PLAs), and the like, arbiter 538 could be implemented with a microcontroller executing stored program instructions to evaluate the relative timing eligibility of the pending commands. In this case some of the instructions may be stored in a non-transitory computer memory or computer readable storage medium for execution by the microcontroller. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

APU 110 of FIG. 1 or memory controller 500 of FIG. 5 or any portions thereof, such as arbiter 538, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 510 and/or power engine 550 may vary in different embodiments. Memory controller 500 may interface to other types of memory besides DDRx memory, such as high bandwidth memory (HBM), RAMbus DRAM (RDRAM), and the like. While the illustrated embodiment showed each rank of memory corresponding to separate DIMMs, in other embodiments each DIMM can support multiple ranks.

Accordingly, it is intended by the appended claims to cover all modifications of the disclosed embodiments that fall within the scope of the disclosed embodiments.

What is claimed is:

1. A memory controller, comprising:
a command queue for receiving and storing memory access requests; and
an arbiter comprising a plurality of sub-arbiters for providing a corresponding plurality of sub-arbitration winners from among said memory access requests during a controller cycle, and a final arbiter for selecting between said plurality of sub-arbitration winners to provide a plurality of memory commands in a corresponding controller cycle, wherein a memory command cycle is shorter in time than said corresponding controller cycle, wherein the memory controller provides said plurality of memory commands to a memory in corresponding memory command cycles.

2. The memory controller of claim 1, wherein:
said controller cycle is defined by a controller clock signal,
said memory command cycle is defined by a memory clock signal, and
said memory clock signal has a higher frequency than said controller clock signal.

3. The memory controller of claim 2, wherein a frequency of said memory clock signal is twice a frequency of said controller clock signal.

4. The memory controller of claim 1, wherein said plurality of sub-arbiters comprises:
a first sub-arbiter coupled to said command queue for determining a first sub-arbitration winner among active entries in said command queue in synchronization with a controller clock signal; and
a second sub-arbiter coupled to said command queue for determining a second sub-arbitration winner among said active entries in said command queue in synchronization with said controller clock signal, said second sub-arbitration winner different from said first sub-arbitration winner,
wherein said final arbiter is operative to output said first sub-arbitration winner as a first memory command in a first cycle of a memory clock signal, and said second sub-arbitration winner as a second memory command in a subsequent cycle of said memory clock signal, wherein a frequency of said memory clock signal is higher that a frequency of said controller clock signal.

5. The memory controller of claim 4, wherein said plurality of sub-arbiters further comprises:
a third sub-arbiter coupled to said command queue for determining a third sub-arbitration winner among active entries in said command queue in synchronization with said controller clock signal.

6. The memory controller of claim 5, wherein:
said final arbiter is for selecting two final arbitration winners from among said first, second, and third sub-arbitration winners, and for providing said two final arbitration winners as said first and second memory commands.

7. The memory controller of claim 6, wherein said final arbiter selects said two final arbitration winners further from among said first, second, and third sub-arbitration winners and an overhead command.

8. The memory controller of claim 7, wherein said overhead command comprises one of a powerdown command, an auto-refresh command, and a calibration command.

9. The memory controller of claim 6, wherein:
said plurality of sub-arbiters further comprises at least one additional sub-arbiter of a same type as one of said first sub-arbiter, said second sub-arbiter, and said third sub-arbiter, and
said final arbiter is able to select two final arbitration winners of said same type from among said plurality of sub-arbiters in said corresponding controller cycle.

10. The memory controller of claim 5, wherein:
said first sub-arbiter selects said first sub-arbitration winner from page hit commands in said command queue;
said second sub-arbiter selects said second sub-arbitration winner from page conflict commands in said command queue; and
said third sub-arbiter selects said third sub-arbitration winner from page miss commands in said command queue.

11. The memory controller of claim 1, wherein:
each of said plurality of sub-arbiters selects arbitration winners among commands of an associated type in said command queue,
at least two of said plurality of sub-arbiters selects arbitration winners of a same type, and
said arbiter is able to select two final arbitration winners of said same type from among said plurality of sub-arbiters in said corresponding controller cycle.

12. A data processing system, comprising:
a memory accessing agent for providing memory access requests;
a memory system; and
a memory controller coupled to said memory accessing agent and said memory system, comprising:
  a command queue for storing memory access commands received from said memory accessing agent; and
  an arbiter comprising a plurality of sub-arbiters for providing a corresponding plurality of sub-arbitration winners from among said memory access requests during a controller cycle, and a final arbiter for selecting between said plurality of sub-arbitration winners to provide a plurality of memory commands in a corresponding controller cycle, wherein a memory command cycle is shorter in time than said corresponding controller cycle wherein the memory controller provides said plurality of memory commands to a memory in corresponding memory command cycles.

13. The data processing system of claim 12, wherein said memory accessing agent comprises:
a central processing unit core;
a graphics processing unit core; and
a data fabric for interconnecting said central processing unit core and said graphics processing unit core to said memory controller.

14. The data processing system of claim 12, wherein:
said controller cycle is defined by a controller clock signal,
said memory command cycle is defined by a memory clock signal, and
said memory clock signal has a higher frequency than said controller clock signal.

15. The data processing system of claim 14, wherein a frequency of said memory clock signal is twice a frequency of said controller clock signal.

16. The data processing system of claim 12, wherein said plurality of sub-arbiters comprises:
a first sub-arbiter coupled to said command queue for determining a first sub-arbitration winner among active entries in said command queue in synchronization with a controller clock signal; and
a second sub-arbiter to said command queue for determining a second sub-arbitration winner among said active entries in said command queue in synchronization with said controller clock signal, said second sub-arbitration winner different from said first sub-arbitration winner,
wherein said memory controller is operative to output said first sub-arbitration winner as a first memory command in a first cycle of a memory clock signal, and said second sub-arbitration winner as a second memory command in a subsequent cycle of said memory clock signal, wherein a frequency of said memory clock signal is higher that a frequency of said controller clock signal.

17. The data processing system of claim 16, wherein said plurality of sub-arbiters further comprises:
a third sub-arbiter coupled to said command queue for determining a third sub-arbitration winner among active entries in said command queue in synchronization with said controller clock signal.

18. The data processing system of claim 17, wherein:
said final arbiter is for selecting two final arbitration winners from among said first, second, and third sub-arbitration winners, and for providing said two final arbitration winners as said first and second memory commands.

19. The data processing system of claim 18, wherein:
said plurality of sub-arbiters further comprises at least one additional sub-arbiter of a same type as one of said first sub-arbiter, said second sub-arbiter, and said third sub-arbiter, and
said final arbiter is able to select two final arbitration winners of said same type from among said plurality of sub-arbiters in said corresponding controller cycle.

20. The data processing system of claim 17, wherein:
said first sub-arbiter selects said first sub-arbitration winner from page hit commands in said command queue;
said second sub-arbiter selects said second sub-arbitration winner from page conflict commands in said command queue; and
said third sub-arbiter selects said third sub-arbitration winner from page miss commands in said command queue.

21. The data processing system of claim 12, wherein:
each of said plurality of sub-arbiters selects arbitration winners among commands of an associated type in said command queue,
at least two of said plurality of sub-arbiters selects arbitration winners of a same type, and
said arbiter is able to select two final arbitration winners of said same type from among said plurality of sub-arbiters in said corresponding controller cycle.

22. A method, comprising:
receiving a plurality of memory access requests;
storing said plurality of memory access requests in a command queue; and
selecting memory access requests from said command queue wherein said selecting comprises:
  selecting a plurality of sub-arbitration winners from among said memory access requests during a first controller cycle; and
  selecting between said plurality of sub-arbitration winners to provide a plurality of memory commands in a corresponding plurality of memory command cycles, wherein a memory command cycle is shorter in time than a corresponding controller cycle, and
providing said plurality of memory commands to a memory in corresponding memory command cycles.

23. The method of claim 22, wherein said selecting said plurality of sub-arbitration winners comprises:
selecting a first sub-arbitration winner from page hit commands in said command queue;
selecting a second sub-arbitration winner from page conflict commands in said command queue; and
selecting a third sub-arbitration winner from page miss commands in said command queue.

24. The method of claim 23, further comprising:
selecting a fourth sub-arbitration winner from among one of said page hit commands, said page conflict commands, and said page miss commands in said command queue; and selecting two final arbitration winners of a same type from among said first, second, third, and fourth sub-arbitration winners in said first controller cycle.

25. The method of claim 22, further comprising:
selecting among said plurality of sub-arbitration winners and an overhead command to provide a second plurality of memory commands in a corresponding second plurality of memory cycles.

26. The method of claim 25, further comprising:
providing said overhead command as one of a power-down command, an auto-refresh command, and a calibration command.

27. The method of claim 22, wherein:
said selecting said plurality of sub-arbitration winners from among said memory access requests during said first controller cycle comprises selecting a first plurality of sub-arbitration winners of a same type from among said memory access requests during said first controller cycle; and the method further comprises selecting two final arbitration winners of said same type during said first controller cycle.

\* \* \* \* \*